(12) United States Patent
Propheter-Hinckley

(10) Patent No.: US 12,553,348 B2
(45) Date of Patent: Feb. 17, 2026

(54) AIRFOIL WITH ARCED BAFFLE

(71) Applicant: United Technologies Corporation, Farmington, CT (US)

(72) Inventor: Tracy A. Propheter-Hinckley, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 897 days.

(21) Appl. No.: 16/532,617

(22) Filed: Aug. 6, 2019

(65) Prior Publication Data

US 2020/0149401 A1    May 14, 2020

Related U.S. Application Data

(60) Provisional application No. 62/757,932, filed on Nov. 9, 2018.

(51) Int. Cl.
*F01D 5/14* (2006.01)
*F01D 5/18* (2006.01)

(52) U.S. Cl.
CPC .............. *F01D 5/141* (2013.01); *F01D 5/18* (2013.01); *F05D 2260/201* (2013.01); *F05D 2260/2214* (2013.01)

(58) Field of Classification Search
CPC .......... F01D 5/187; F01D 5/188; F01D 5/189; F01D 9/06; F01D 9/065; F01D 2240/126
See application file for complete search history.

(56) References Cited

U.S. PATENT DOCUMENTS

| | | | | |
|---|---|---|---|---|
| 4,504,189 A * | 3/1985 | Lings | ...................... | F01D 9/041 415/115 |
| 4,741,667 A * | 5/1988 | Price | ...................... | F01D 5/189 415/115 |
| 5,743,708 A | 4/1998 | Cunha et al. | | |
| 6,468,031 B1 * | 10/2002 | Yu | ........................... | F01D 5/189 415/115 |
| 6,506,013 B1 | 1/2003 | Burdgick et al. | | |
| 6,561,757 B2 * | 5/2003 | Burdgick | ................ | F01D 25/12 415/114 |
| 6,742,984 B1 * | 6/2004 | Itzel | ....................... | F01D 5/189 29/889.722 |
| 7,056,083 B2 | 6/2006 | Gray | | |

(Continued)

FOREIGN PATENT DOCUMENTS

EP     1149983     10/2001

OTHER PUBLICATIONS

European Search Report for European Patent Application No. 19207542.2 completed Apr. 2, 2020.

*Primary Examiner* — Christopher R Legendre
(74) *Attorney, Agent, or Firm* — Carlson, Gaskey & Olds, P.C.

(57) ABSTRACT

An airfoil includes an airfoil section that has an airfoil wall that defines a convex leading end, a trailing end, and first and second sides that join the convex leading end and the trailing end. The first and second sides span in a longitudinal direction between first and second ends. The airfoil wall circumscribes an internal core cavity. An arced rib is disposed in the internal core cavity and arcs toward the convex leading end. The arced rib and the convex leading define there between an arced cavity. An arced baffle is disposed in the arced cavity.

3 Claims, 4 Drawing Sheets

(56) References Cited

U.S. PATENT DOCUMENTS

| | | | | |
|---|---|---|---|---|
| 7,086,829 B2* | 8/2006 | Fuller | ............. | F01D 5/186 |
| | | | | 415/115 |
| 7,104,756 B2* | 9/2006 | Harding | ............. | F01D 5/189 |
| | | | | 416/233 |
| 7,572,103 B2* | 8/2009 | Walters | ............. | F01D 5/187 |
| | | | | 416/97 R |
| 8,985,278 B2* | 3/2015 | Xu | ............. | F01D 25/20 |
| | | | | 184/6.11 |
| 9,403,208 B2* | 8/2016 | Propheter-Hinckley | ............. | |
| | | | | B22C 9/103 |
| 10,329,932 B2* | 6/2019 | Spangler | ............. | F01D 9/065 |
| 10,669,861 B2* | 6/2020 | Spangler | ............. | F01D 9/041 |
| 10,697,307 B2* | 6/2020 | LoRicco | ............. | F01D 9/065 |
| 11,028,702 B2* | 6/2021 | Propheter-Hinckley | ............. | |
| | | | | F01D 9/041 |
| 11,512,597 B2* | 11/2022 | Propheter-Hinckley | ............. | |
| | | | | F01D 5/187 |
| 11,525,360 B2* | 12/2022 | Martineau | ............. | F01D 5/30 |
| 2011/0064585 A1* | 3/2011 | Anguisola Mcfeat | ............. | F01D 5/187 |
| | | | | 416/97 R |
| 2015/0027657 A1* | 1/2015 | Propheter-Hinckley | ............. | |
| | | | | B22C 9/108 |
| | | | | 164/519 |
| 2018/0298760 A1* | 10/2018 | Subramaniyan | ............. | F01D 9/041 |
| 2018/0328187 A1* | 11/2018 | Oke | ............. | F01D 9/065 |
| 2020/0149401 A1* | 5/2020 | Propheter-Hinckley | ............. | |
| | | | | F01D 5/18 |
| 2020/0149402 A1* | 5/2020 | Propheter-Hinckley | ............. | |
| | | | | F01D 5/141 |
| 2020/0332663 A1* | 10/2020 | Propheter-Hinckley | ............. | |
| | | | | F01D 25/12 |
| 2020/0332665 A1* | 10/2020 | Arisi | ............. | F01D 5/187 |

* cited by examiner

AIRFOIL WITH ARCED BAFFLE

CROSS REFERENCE TO RELATED APPLICATION

This application claims benefit to U.S. Provisional application No. 62/757,932 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines a convex leading end, a trailing end, and first and second sides that join the convex leading end and the trailing end. The first and second sides span in a longitudinal direction between first and second ends. The airfoil wall circumscribes an internal core cavity, and there is an arced rib in the internal core cavity that arcs toward the convex leading end. The arced rib and the convex leading end define there between an arced cavity. An arced baffle is disposed in the arced cavity.

In a further embodiment of any of the foregoing embodiments, the arced rib substantially follows the convex leading end.

In a further embodiment of any of the foregoing embodiments, the arced rib is semi-circular.

In a further embodiment of any of the foregoing embodiments, the arced baffle is semi-circular.

In a further embodiment of any of the foregoing embodiments, the convex leading end is semi-circular.

In a further embodiment of any of the foregoing embodiments, the arced baffle has a radius of curvature and is in a fixed position in the arced cavity with a stand-off distance from the convex leading end and the arced rib, and the radius of curvature is greater than the stand-off distance.

In a further embodiment of any of the foregoing embodiments, the radius of curvature is greater than 0.25 centimeters.

In a further embodiment of any of the foregoing embodiments, the arced baffle includes impingement orifices.

In a further embodiment of any of the foregoing embodiments, the arced baffle includes a forward wall, an aft wall, and lateral walls, and the impingement orifices are in the lateral walls.

In a further embodiment of any of the foregoing embodiments, the arced cavity spans from the first end to the second end.

In a further embodiment of any of the foregoing embodiments, the trailing end is convex.

In a further embodiment of any of the foregoing embodiments, the arced baffle has a radius of curvature and is in a fixed position in the arced cavity with a stand-off distance from the convex leading end and the arced rib, and the radius of curvature is greater than the stand-off distance.

In a further embodiment of any of the foregoing embodiments, the radius of curvature is greater than 0.25 centimeters.

In a further embodiment of any of the foregoing embodiments, the arced rib substantially follows the convex leading end.

In a further embodiment of any of the foregoing embodiments, the arced rib is semi-circular, the arced baffle is semi-circular, and the convex leading end is semi-circular.

A gas turbine engine according to an example of the present disclosure includes a compressor section, a combustor in fluid communication with the compressor section, and a turbine section in fluid communication with the combustor. The turbine section has a turbine airfoil that includes an airfoil section according to any of the foregoing embodiments.

A method for assembling an airfoil according to an example of the present disclosure includes an airfoil section according to any of the foregoing embodiments. The method includes inserting the arced baffle into the arced cavity or, if the arced baffle is already in the arced cavity, removing the arced baffle from the arced cavity. The inserting and removing each include moving the arced baffle along an arced path.

In a further embodiment of any of the foregoing embodiments, the arced baffle has a radius of curvature, and the arced path has a radius of curvature that is equal to the radius of curvature of the arced baffle.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
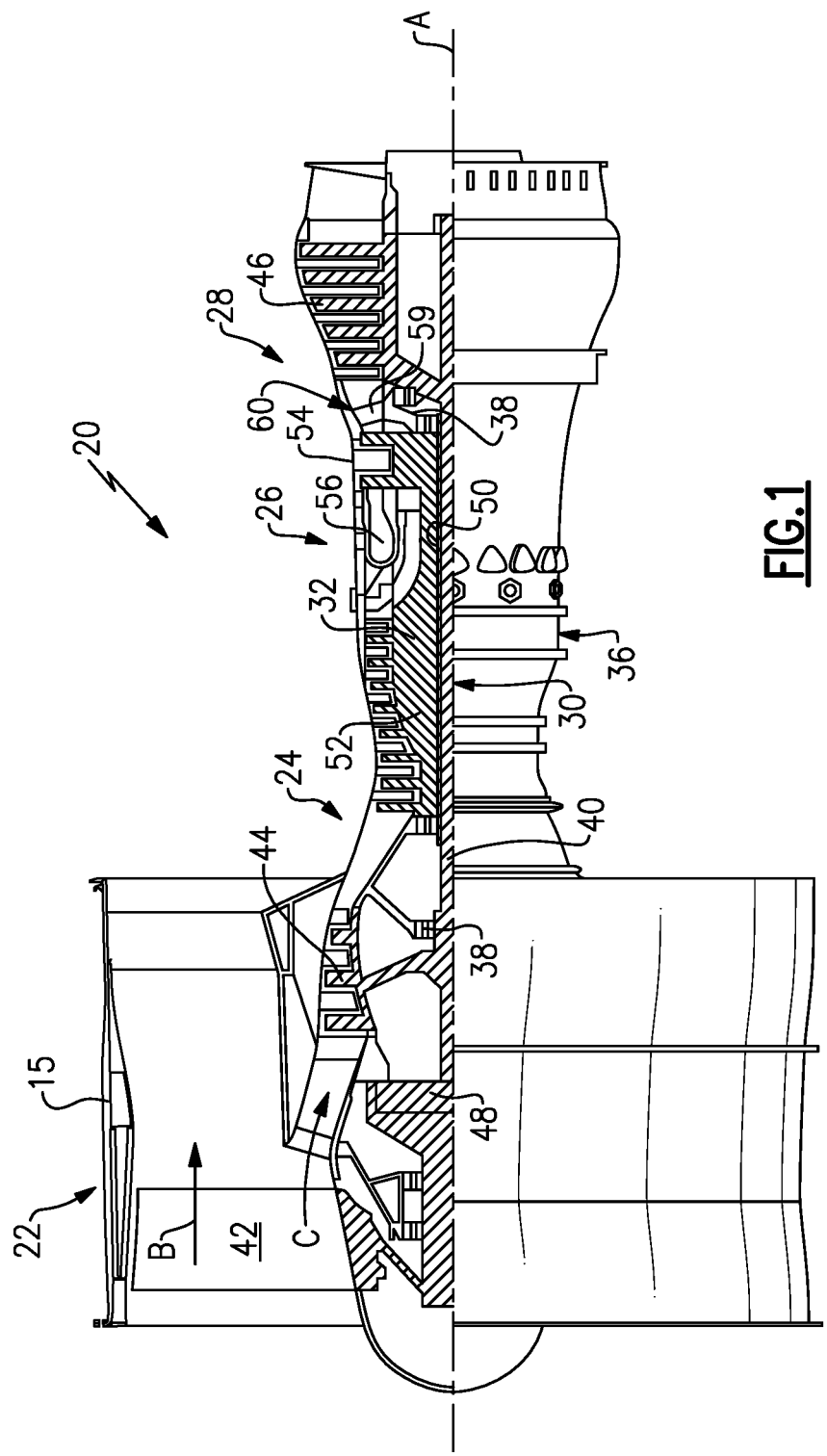
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
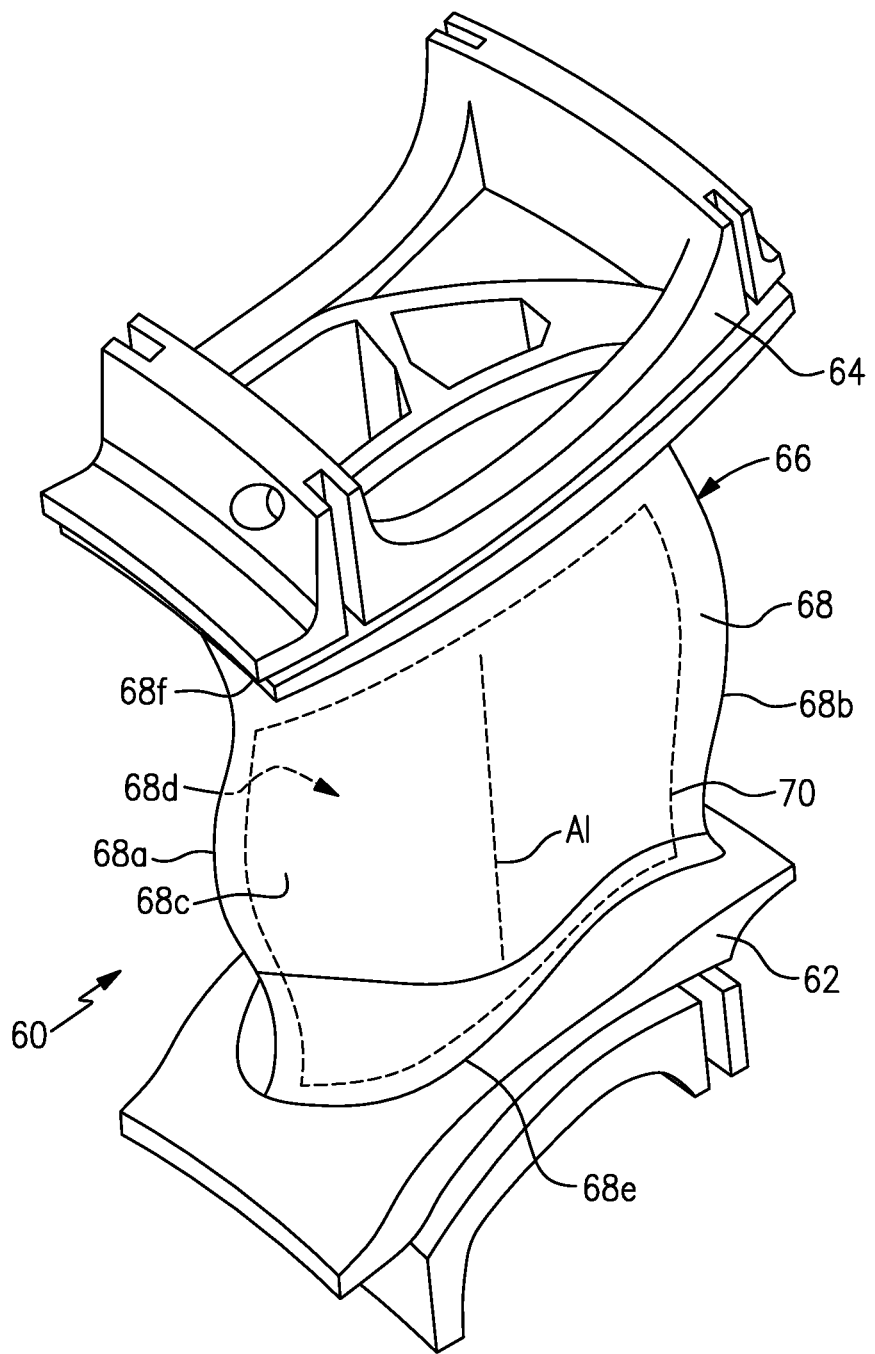
FIG. 2 illustrates an example airfoil of the gas turbine engine of FIG. 1.

FIG. 2 illustrates a representative example of a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades.

The turbine airfoil 60 includes an inner or first platform 62, an outer or second platform 64, and an airfoil section 66 that radially spans between the inner and outer platforms 62/64. Terms such as "radially," "axially," or variations thereof are used herein to designate directionality with respect to the engine central axis A.

The airfoil section 66 includes an airfoil outer wall 68 that delimits the profile of the airfoil section 66. The outer wall 68 defines a convex leading end 68a, a convex trailing end 68b, and first and second sides 68c/68d that join the leading and trailing ends 68a/68b. The first and second sides 68c/68d span in a longitudinal direction, denoted by axis A1, between first and second ends 68e/68f. The first and second ends 68e/68f are attached, respectively, to the first and second platforms 62/64. In this example, the first side 68c is a pressure side and the second side 68d is a suction side.

The convex leading end 68a and the convex trailing end 68b are convex with respect to the axial middle of the airfoil section 66. That is, the convex leading end 68a bows outwards relative to the middle of the airfoil section, and the convex trailing end bows outwards from the middle of the airfoil section 66.

Figure 3:
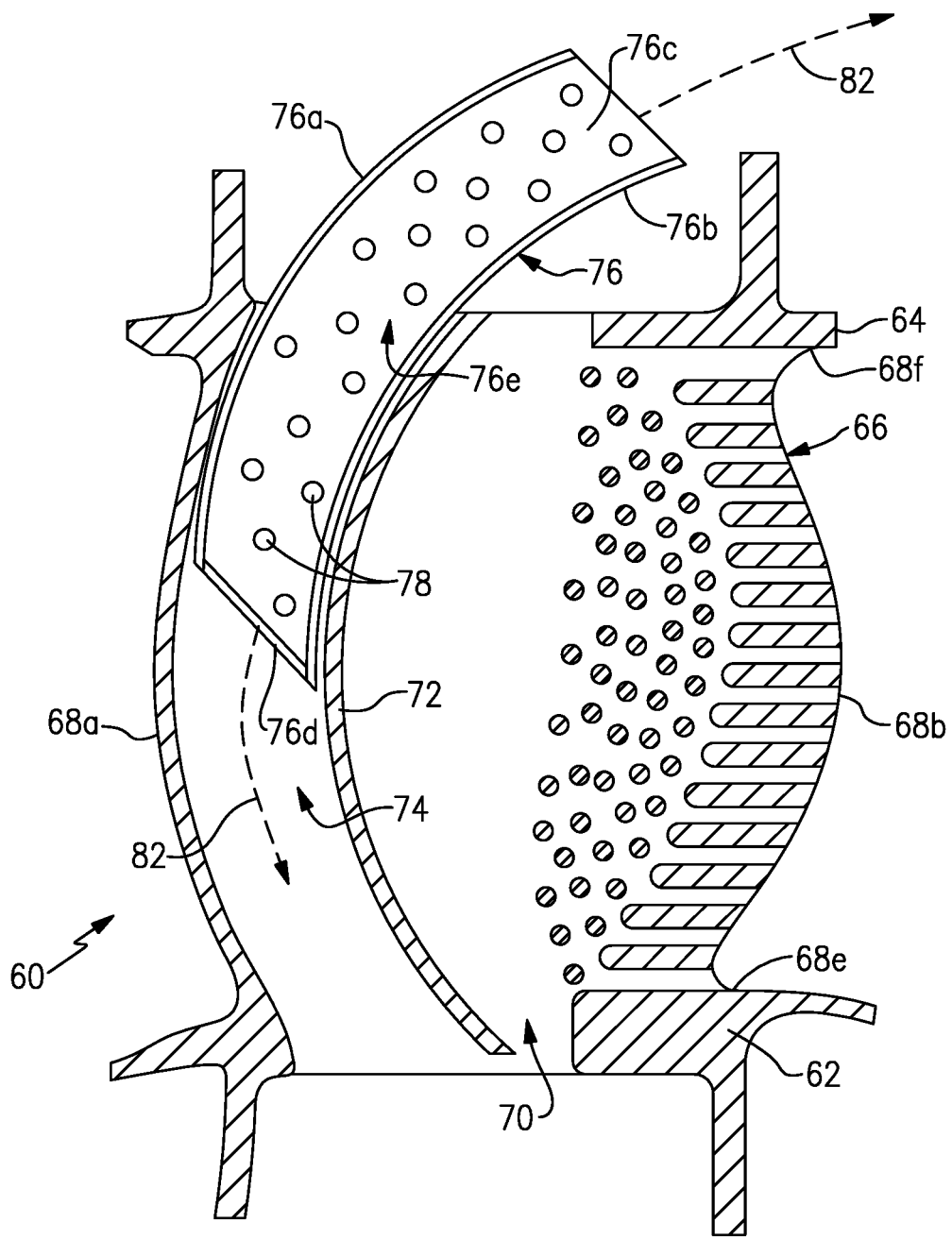
FIG. 3 illustrates a sectioned view of the airfoil of FIG. 2.
Figure 4:
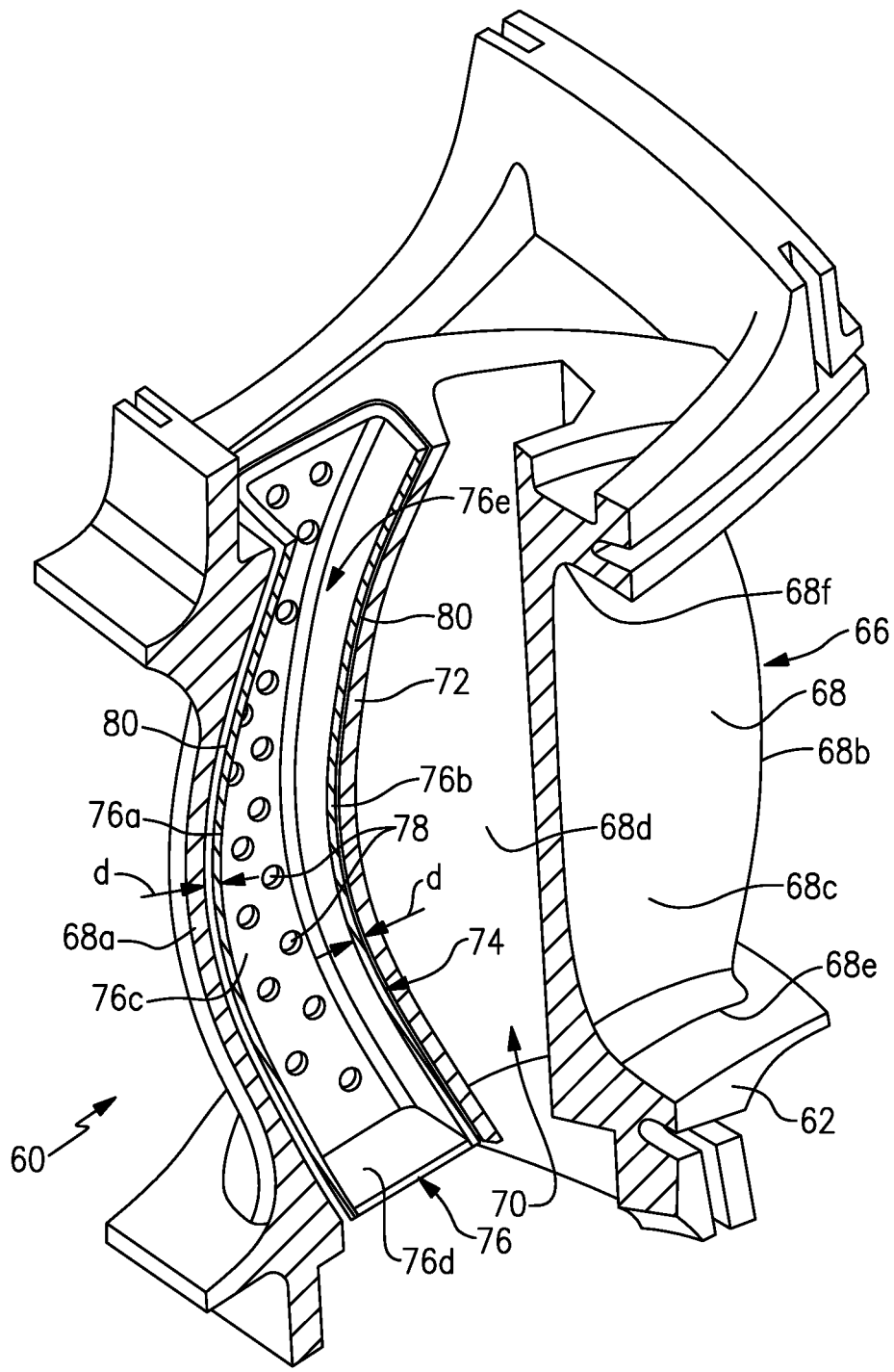
FIG. 4 illustrates a partial cutaway view of the airfoil of FIG. 2.

FIG. 3 illustrates a sectioned view taken radially through the airfoil 60, and FIG. 4 illustrates a partial cutaway view of the airfoil 60. The outer wall 68 of the airfoil section 66 circumscribes an internal core cavity 70. The airfoil section 66 further includes an arced rib 72 in the internal core cavity 70. The arced rib 72 arcs toward the convex leading end 68a. For example, the arced rib 72 substantially follows the curvature of the convex leading end 68a. In further examples, the arced rib 72 and is semi-circular and the convex leading end 68a is semi-circular. In one example, the arced rib 72 and the convex leading end 68a each have a radius of curvature, and the radii of curvatures are equal.

The arced rib 72 partitions the internal core cavity 70, diving the cavity 70 into a forward portion and an aft portion. In this example, the arced rib 72 extends from the first side 68c to the second side 68d and is solid and free of any orifices. The arced rib 72 thereby fluidly isolates the forward and aft portions of the internal core cavity 70.

The arced rib 72 and the convex leading 68a define therebetween an arced cavity 74 in the forward portion of the internal core cavity 70. In this example, the arced rib 72 defines an aft margin of the arced cavity 74 and the convex leading end 68a defines a forward margin of the arced cavity 74. The first and second sides 68c/68d define the lateral margins of the arced cavity 74. In examples in which the arced rib 72 and the convex leading end 68a are semi-circular, the arced cavity 74 is thus also semi-circular and may thereby have a radius of curvature that is also equal to the radii of curvatures of the arced rib 72 and the convex leading end 68a.

An arced baffle 76 is disposed in the arced cavity 74. The arced baffle 76 includes a forward wall 76a, an aft wall 76b, and lateral walls 76c. The arced baffle 76 may also include an endwall 76d near the first platform 62, while the opposite end at the second platform 64 may be open to receive cooling air. Only one of the lateral walls 76c is shown in FIG. 4, as the other is cutaway, although it is to be understood that the other lateral wall 76c is substantially identical to the lateral wall 76c that is shown. In this illustrated example, the lateral walls 76c include impingement orifices 78. The walls 76a/76b/76c/76d of the arced baffle 76 define an interior baffle chamber 76e.

The shape of the arced baffle 76 follows the curvatures of the arced rib 72, the convex leading end 68a, and the first and second sides 68c/68d of the airfoil wall 68. The overall shape of the arced baffle 76 thus corresponds to the geometry of the arced cavity 74 but is smaller than the arced cavity 74 so as to enable assembly/disassembly of the arced baffle 76 into/from the arced cavity 74. In examples in which the arced rib 72 and the convex leading end 68a are semi-circular, the arced baffle 76 is thus also semi-circular and may thereby have a radius of curvature that is also equal to the radii of curvatures of the arced rib 72 and the convex leading end 68a.

The arced baffle 76 is in a fixed position in the arced cavity 74. For instance, the arced baffle 76 can be welded or otherwise affixed with the first platform 62, the second platform 64, or both. In the fixed position, which is shown in FIG. 4, there is a gap 80 surrounding the arced baffle 76. The gap 80 provides a stand-off distance (d) between the arced baffle 76 and the arced rib 72, between the arced baffle 76 and the convex leading end 68a, and between the arced baffle 76 and each of the first and second sides 68c/68d. Because the arced baffle 76 corresponds to the geometry of the arced cavity 74, the gap 80 is substantially constant. In turn, the stand-off distance (d) is substantially constant around the arced baffle 76. As will be appreciated, due to manufacturing and assembly tolerances, the gap 80 and stand-off distance (d) may vary somewhat.

The size of the gap 80 and stand-off distance (d) are selected according to cooling performance requirements. For instance, during operation of the engine 20, cooling air, such as bleed air from the compressor section 24, is provided through the second platform 64 into the interior chamber 76e of the arced baffle 76. The cooling air flows out from the interior chamber 76e through the impingement orifices 78 and impinges on the first and second sides 68c/68d, thereby cooling the sides 68c/68d.

The shape of the airfoil section 66 and, in particular the convex leading end 68a, are designed for aerodynamic performance. However, the convex leading end 68a challenges the use of a baffle for enhanced impingement cooling. More specifically, a typical airfoil section for a turbine airfoil of a gas turbine engine has a straight leading end and a straight rib that define a straight leading end cavity. However, when the leading end is convex for enhanced aerodynamic performance, the convex leading end and the straight rib form a D-shaped cavity. To obtain a constant gap and stand-off distance in such a D-shaped cavity, the baffle would need to also be D-shaped. Because the D-shaped cavity is larger in the middle and narrower at the ends, it is impossible to fit a D-shaped baffle through one of the narrow ends into the cavity. A constant gap and stand-off distance is thus unobtainable.

In contrast, the arced rib 72 of the disclosed airfoil section 66 enables the use of a baffle in combination with the convex leading end 68a. Due to the arced rib 72, the shape of the arced cavity 74 is such that the arced baffle 76 can be readily inserted into, or removed from, the arced cavity 74 without undue interference from a narrow entrance constriction as with a D-shaped cavity.

As an example, FIG. 3 also demonstrates a method of either inserting the arced baffle 76 into, or removing the arced baffle 76 from, the arced cavity 74. For instance, to either insert or remove the arced baffle 76 from the arced cavity 74, the arced baffle 76 is moved along an arced path, designated at 82. The arced path 82 may be a continuation of the arc of the arced cavity 74. In examples in which the arced rib 72 and the convex leading end 68a are semi-circular, the arced path 82 may thus also be semi-circular and may thereby have a radius of curvature that is also equal to the radii of curvatures of the arced rib 72 and the convex leading end 68a. The arced baffle 76 may be inserted into, or removed from, the arced cavity 74 during an original assembly operation or during a repair or replacement process.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil section having an airfoil wall defining a convex leading end, a trailing end, and first and second sides joining the convex leading end and the trailing end, the first and second sides spanning in a longitudinal direction between first and second ends, the airfoil wall circumscribing an internal core cavity, the trailing end is convex, and the convex leading end and the trailing end are convex relative to an axial middle of the airfoil section;
    an arced rib in the internal core cavity and arcing toward the convex leading end, the arced rib and the convex leading end defining there between an arced cavity, and the convex leading end and the arced rib are both convex from the first end to the second end; and
    an arced baffle disposed in the arced cavity, the arced baffle including a forward wall, an aft wall, and lateral walls, and the forward wall and the aft wall are both arced, wherein each of the convex leading end, the arced rib, and the arced baffle is of a constant radii of curvature from the first end to the second end.

2. An airfoil comprising:

an airfoil section having an airfoil wall defining a convex leading end, a trailing end, and first and second sides joining the convex leading end and the trailing end, the first and second sides spanning in a longitudinal direction between first and second ends, the airfoil wall circumscribing an internal core cavity;

an arced rib in the internal core cavity and arcing toward the convex leading end, the arced rib and the convex leading end defining there between an arced cavity; and an arced baffle disposed in the arced cavity, wherein the arced baffle is in a fixed position in the arced cavity with a constant stand-off distance between the convex leading end and the arced baffle and between the arced baffle and the arced rib.

3. The airfoil as recited in claim 2, wherein the arced baffle has a radius of curvature, and the radius of curvature is greater than the stand-off distance.

* * * * *